United States Patent [19]

Romey et al.

[11] Patent Number: 5,069,795
[45] Date of Patent: Dec. 3, 1991

[54] PROCESS FOR SEPARATING HYDROCARBONS FROM WASTE WATER

[75] Inventors: Ingo Romey, Hünxe; Reinhard Pass, Essen, both of Fed. Rep. of Germany

[73] Assignee: Bergwerksverband GmbH, Essen, Fed. Rep. of Germany

[21] Appl. No.: 350,710

[22] PCT Filed: Oct. 14, 1987

[86] PCT No.: PCT/EP87/0600
§ 371 Date: Apr. 5, 1989
§ 102(e) Date: Apr. 5, 1989

[87] PCT Pup No.: WO88/02655
PCT Pup Date: Apr. 21, 1988

[30] Foreign Application Priority Data

Oct. 18, 1986 [DE] Fed. Rep. of Germany ....... 3635461

[51] Int. Cl.⁵ .................... B01D 37/02; C02F 1/28
[52] U.S. Cl. .................... 210/652; 210/663; 210/694; 210/769; 210/777; 210/778; 210/799
[58] Field of Search ........... 210/652, 663, 691, 694, 210/769, 777, 778, 799, 323.2

[56] References Cited

U.S. PATENT DOCUMENTS 4,704,210 11/1987 Boze et al. ...................... 210/799
4,780,211 10/1988 Lien ............................... 210/799

*Primary Examiner*—Ivars Cintins
*Attorney, Agent, or Firm*—Herbert Dubno; Jonathan Myers

[57] ABSTRACT

A process for separating hydrocarbons from waste water, in particular aromatic hydrocarbons, by means of an absorbing filtering layer. The hydrocarbons dissolved and non-dissolved in the waste water are separated in a single stage. The waste water is supplied to a metallic slotted multiple tube filter, and a hydrocarbon-containing material, preferably coking duff, is used as an adsorbing filtering layer. Its grain size distribution in the particle size range between 0.05–0.2 mm has a mass proportion of at least 25% by weight, with a total surface area of at least 1500 cm²/g. The filtering material can be made to float on the filtering elements or added to the waste water.

8 Claims, 1 Drawing Sheet

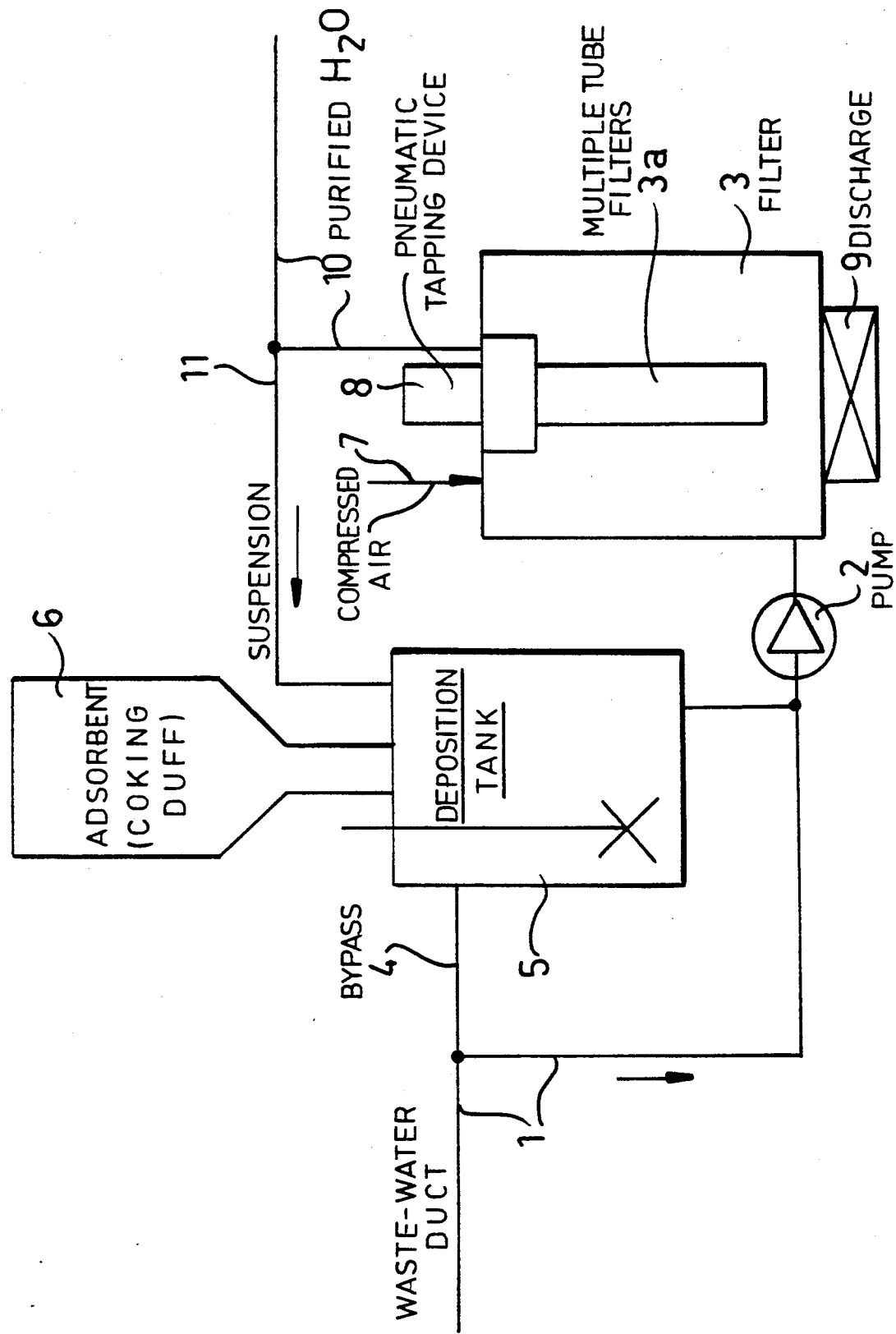

PROCESS FOR SEPARATING HYDROCARBONS FROM WASTE WATER

FIELD OF THE INVENTION

The invention refers to a process for separating hydrocarbons, particularly aromatic hydrocarbons from waste water, with an adsorptive filter aid.

BACKGROUND OF THE INVENTION

During various technological processes, among others also during the coking of stone coal, waste waters result which are contaminated with hydrocarbons. Primarily, the polycyclic hydrocarbons (PAH) possibly contained in the waste water, have to be removed to the largest possible extent. Especially biological waste water stages are additionally loaded with a high concentration of hydrocarbons.

Other processes of waste-water purification, for instance reverse osmosis or adsorptive treatment, require a preliminary purification stage.

Depending on their concentration or chemical composition, the hydrocarbons contained in the waste water are partially dissolved and particularly bound to particles existing in the waste waters.

For this reason it is desirable to have a purification process which removes simultaneously not only the water-soluble hydrocarbons, but also the ones bound to solid substances.

For the separation of hydrocarbons from waste waters of coking plants, it has already been proposed to obtain an at least partially effective separation by filtration through a filter aid of wood dust in a vacuum revolving filter (Fachberichte Hüttenpraxis Metallverarbeitung, Vol. 22, No. 10, 1984, 1088-1092). This filter aid is quickly clogged by the entering fine particles, so that an external, thin filtering layer has constantly to be removed by a scraper. Especially the use of wood dust for the filter layer in connection with the use of a vacuum revolving filter, due to rapid transitions from soaking to drying of the particles resulting from the revolving of the drum, lead to so-called drying cracks, and thus to the escape of suspension. Very thick filter cake layers facilitate drying cracks.

The use of wood dust as filter aid impairs considerably the economy of the process, since it often represents a substance which is external to the operation.

Also, by the use of vacuum for the drying of the filter cake, considerable costs are incurred.

Besides wood dust, other commercially available filter aids are used, such as kieselguhr, celit, or cellulose. Primarily due to cost reasons or to additional problems connected to the disposal of the filter residue, the use of such filter aids is made difficult.

For a clean adsorptive waste water purification, it is possible to use activated carbons or cokes (VDI Forschungsheft No. 607/1981). This process, however, requires a high technical effort for the regeneration of adsorbents since especially for costs reasons the disposal of loaded activated carbon through other methods (burning or storage) is prohibitive. Besides the waste water in adsorptive purification has to be extensively free of solid substances. The solid substances often found in waste waters are thus extremely damaging to the adsorptive waste-water purification. These solid substances accumulate in the adsorbent and cannot be completely removed even during the regeneration of the activated coal. As a result, the efficiency of the adsorbent decreases. A removal of the solid foreign substances has to take place separately from the adsorptive purification stage.

A further process for the purification of waste waters is the reverse osmosis. This purification process makes it possible for the operator to obtain a permeate almost free of noxious substances by concentrating the noxious substances present in the solution. Damaging are in this case the insoluble and colloidal impurities which block (clog) the reverse-osmosis membrane. A relative measure for the clogging effect of suspensions is the blocking index. The method for the determination of the blocking index is described in the ASTM-regulation D 4189-82 "Silt Density Index of Water". Tests have proven that when the blocking index is lower than three, a clogging of the membranes is not to be expected in the operation of reverse-osmosis installations. The preliminary purification of the suspension for the reduction of the blocking index, which is necessary for the reverse osmosis, can be performed for instance by using one-way filter cartridges of flush-back filters.

OBJECT OF THE INVENTION

It is the object of the present invention to develop a process for the separation of hydrocarbons, particularly of aromatic hydrocarbons, from waste waters, whereby not only the hydrocarbons bound to solid particles are removed from the waste water through filtration, but at the same time the hydrocarbons dissolved in the waste water and often contained therein in high concentrations, can be removed.

SUMMARY OF THE INVENTION

This problem is solved by the process according to the invention due to the fact that, the hydrocarbons which are dissolved in the waste water and the ones which are not are separated in one step, by feeding the waste waters to a metallic slotted multiple tube filter, and a coking duff serves as an adsorbing filter aid, and its grain size distribution in the particle size range between 0.05-0.2 mm has a mass proportion of a least 25% by weight, with a surface of at least 1500 $cm^2g$. The proposed process combines the separation of the solid particles with a wide-range separation of hydrocarbons in a manner which offers considerable technological advantages in comparison with the filtration with rotary drum filters assisted by wood-dust filters.

Besides acting as a mechanical barrier for the particles, the coking duff has an adsorptive effect, so that in addition to the hydrocarbons bound to solid particles, the hydrocarbons which are dissolved in the water are also captured in the filter layer.

The filter layer applied to the slotted multiple tube filter is completely covered by waste water during the entire filtration process, so that the drying cracks known from the vacuum drum filters cannot occur here in the filter layer.

Since the grain size distribution of the adsorbing coking duff represents a mass proportion of at least 25% by weight in the particle size range of 0.05 to 0.2 mm and the outer surface of the coking duff used is at least of 1500 $cm^2/g$, the permeability of the auxiliary filtering layer and a high degree of clarification for the solid impurities and dissolved hydrocarbons are equally insured. The outer surface results from the grain distribution, which is represented in the logarithmic distribution network according to DIN 66144.

Due to the process, an average extraction capacity of 98% for the polycyclic hydrocarbons bound to particles can be achieved; the filtrate concentration for the tri- and polynuclear aromatics lies invariably below the testing limit. For the dissolved hydrocarbons, an extraction capacity of approximately 98% can be reached, depending on the used quantity of coking duff.

Filtration apparatus with metallic slotted multiple tube filters for the separation of hydrocarbons are known for instance from German Patent 27 06 938 and German Patent 28 28 976.

The grain size distribution in the particle size rang of 0.05 to 0.2 mm ought to have a mass proportion of at least 40% by weight, when an even better permeability of the filter material is required.

The coking duff which results during the production of metallurgical coke is subjected to corresponding preparation, i.e. it is milled and screened.

Depending on the water composition, it can be advantageous to deposit either a filter layer of coking duff of the aforementioned particle size onto the slotted multiple tube filters and/or to add the coking duff to the waste water prior to filtration. In the second case, it is particularly advantageous to make possible an adsorption of the dissolved hydrocarbons contained in the waste water already before filtration. The coking duff can be divided between the layer floating on the filtering elements and the additional dosage at a ratio of 80:20 to 30:70.

The total amount suitably equals 0.1% by weight up to 1% by weight of filter aid, with respect to the quantity of waste water.

After the conclusion of the filtration, i.e. when the adsorptive effect of the filter layer is exhausted, or when due to particle clogging in the filter layer an inadmissibly high resistance to flow results, the filter layer is dried through the passage of compressed air and disposed of in solid form. The filter residue, consisting almost entirely of carbon, except for some residual water, has a low residual moisture and can be disposed of through burning or pyrolysis, e.g. in the case of waste water purification, it can be added to the coke in coking plants.

When the standards for the quality of the waste water are particularly high, it is also possible to combine the proposed filtration process with the purely adsorptive waste water purification or with the waste water purification through reverse osmosis.

In both cases, the adsorbent, respectively the reverse osmosis, is relieved of solid substances, respectively the application of these processes is actually made possible.

The invention is further described more in detail with the aid of the drawing and of the examples.

BRIEF DESCRIPTION OF THE DRAWING

The sole FIGURE shows a schematic representation of the process cycle for the separation of hydrocarbons from waste water by means of multiple tube filters.

SPECIFIC DESCRIPTION OF THE DRAWING

A waste water loaded with hydrocarbons coming from the waste water duct 1 is directed to a filter apparatus 3 with slotted multiple tube filters 3a, by means of a pump 2. The impurities are held back together with the filter aid on the multiple tube filters 3a. The purified water is discharged over the pipe 10. Before being fed to the filtering apparatus 3, the stream of waste water can be directed over a bypass pipe 4 into a deposition tank 5, wherein an adsorbing filter aid is added from a silo 6. Due to this switching possibility, the adsorbing filter aid can either be applied prior to filtration on the slotted multiple tube filters 3a (precoat) and/or continuously added to the waste water stream (bodyfeed). The precoating of filter aid on the slotted multiple tube filters 3a takes place so that to the balance of the result of the previous filtration process still in the tank 5, the adsorbing filter aid is added from silo 6. This suspension is pushed by the pump 2 in a closed circuit over the slotted multiple tube filters 3a and the pipe 11 into the deposition tank 5, until approximately 90% of the added adsorbing filter aid is deposited on the slotted multiple tube filters, in the form of a filtering layer. After reaching a limit value for the resistance to flow and/or after the adsorbing filter aid has been exhausted, the filtration is interrupted. For this purpose, a compressed air cushion is applied through the pipe 7 to the sludge side of the multiple tube filters 3a. As a result the filter content in the deposition tank 5 is discharged; the compressed air passes through the filter layer and relieves it extensively of the residual water.

The dried filter layer can be completely removed from the slotted multiple tube filters 3a by a pneumatic tapping device 8 and then discharged from the filter apparatus 3 through gate valve 9.

EXAMPLE 1

In an installation as shown in the drawing, waste water coming from a coking plant and which was prepurified through a rubble filter is treated with a filter apparatus 3 with slotted multiple tube filters 3a (filtering surface 250 cm$^2$; clearance width of the filter cartridge=0.075 mm). In order to apply an adsorbing filter layer with a thickness of 10 mm on the slotted multiple tube filter 3a, the waste water stream coming from duct 1 was directed with a velocity of 5 m$^3$/m$^2$ h over the pipe 4 through the deposition tank 5, wherein an amount of 8 kg coking duff/m$^2$ of filter surface has been laid out before the waste water reaches the filter apparatus 3.

The used coking duff came from a coking plant and had a particle size of 29% by weight between 0.06 and 0.2 mm.

After the deposition of the auxiliary filter layer was completed, the waste water was directly fed into the filter apparatus 3, without further addition of coking duff.

With a differential pressure of 2.5 bar generated by the pump 2, a stream velocity of 2.5 m$^3$/m$^2$h at the beginning of the filtration is reached and a stream velocity of 1.4 m$^3$/m$^2$h at the end of the filtration. The filtration was interrupted after the throughput rates of the filtrate equaled 100 times the prepared coking duff amount.

The concentration of the undissolved polycyclic aromatics still present in the filtrate was below the detection level, which corresponds to a separation >99%. The components dissolved in the waste water at a ratio of 6 mg/l could be reduced by 95% due to the adsorptive effect of the coking duff filter layer.

The filter residue resulted from the filtration could be disposed off by admixing to the coking coal without any damage to the environment.

The exact data of the analysis can be found in the table. A comparison with the data referring to a filtration with an auxiliary wood dust filter is also expressed in the table. It can be seen from there that from the 14 mentioned insoluble compounds, the concentration of 10 compounds has been reduced through filtration below their detection level of 0.1 g/l. From the remaining 4 compounds, three were separated in a proportion of 99%. The comparison example shows a reduction down to the detection level of the compounds found in the raw water only for eight compounds. The separation degree of the remaining compounds ranges between 56 and 99%. Data referring to the separation of the dissolved compounds are not given in the comparison example.

EXAMPLE 2

In this test, as in Example 1, a filter layer of coking duff was laid out, which however in this case had only a thickness of 2 mm. However, after the deposition of this filter layer, the water from the coking plant was not directly fed into the filter apparatus 3, but further directed through the deposition tank 5, wherein the waste water is continuously supplied with coking duff in an amount of 0.1% from the silo 6. The ratio between the laid out coking duff filter layer and the added coking duff amount is of 1:3.

At a differential pressure of 2.5 bar generated by the pump 2, at the beginning of the filtration of a stream velocity of 3.5 m$^3$/m$^2$h was reached, at the end of the filtration the stream velocity was still 0.2 m$^3$/m$^2$h.

The filtration was interrupted, after the throughput rates of the filtrate had reached 2000 times the previously laid out coking duff amount. The concentration of the insoluble polycyclic hydrocarbons still contained in the filtrate was below the detection level. The separation of the water-insoluble PAH with possible carcinogenic effect equaled approx. 99%. The separation of aromatic hydrocarbons dissolved in water equaled 90%.

EXAMPLE 3

In this example, the procedure of Example 1 was repeated. As an adsorbing filter aid here a coking duff was used, whose particles have a proportion of 40% by weight for a grain size range of 0.06 to 0.2 mm. Particularly the undersize <0.06 was reduced.

With a differential pressure of 2.5 bar generated by the pump 2, at the beginning of filtration the stream velocity of the coking plant waste waters was 4.2 m$^3$/m$^2$ h.

The separation efficiency of the insoluble PAH was 95%; the one of the soluble aromatic hydrocarbons was 93%.

EXAMPLE 4

A waste water coming from the tar condensation of a coking plant with a load of approximately 8 g/l of extractable ether proportion, was filtered as in Example 1 through a coking duff layer of 10 mm at a differential pressure of 2 bar. An average stream velocity of 2 m$^3$/m$^2$ h was established. The filtrate had a blocking index of 3. A blocking index of the suspension could not be determined, because of the high content of organic compounds; the test membrane used for this purpose was immediately clogged.

Subsequently the filtrate was set for further processing through reverse osmosis. No blocking of the membrane was observed.

TABLE RESULT OF ANALYSIS OF EXAMPLE 1. COMPARISON EXAMPLE

| Name Compound | Coking plant raw water μg/l | Waste water filtrate μg/l | Separation efficiency % | Filter residue mg/l |
| --- | --- | --- | --- | --- |
| insoluble hydrocarbons | | | | |
| fluorene | 21.8 | 1.4 | 94 | 0.07 |
| phenanthrene | 34 | 0.2 | 99 | 0.83 |
| anthracene | 1.1 | _1) | _2) | 0.11 |
| fluoranthrene | 17.1 | 0.1 | 99 | 0.63 |
| pyrene | 16.0 | 0.2 | 99 | 0.24 |
| benzanthrene | 1.6 | | | — |
| chrysene | 1.4 | | | — |
| benzo(e)pyrene | 3.8 | | | — |
| benzo(b)fluoranthrene | 2.7 | | | 0.07 |
| benzo(k)fluoranthrene | 1.7 | _1) | _2) | 0.17 |
| benzo(a)pyrene | 3.6 | | | 0.08 |
| dibenzo(a,H) anthracene | <0.1 | | | 0.19 |
| benzo(g,h,i)perylene | 0.6 | | | 0.14 |
| indeno(1,2,3,-cd) pyrene | 1.1 | | | 0.14 |
| soluble hydrocarbons | | | | |
| naphthalene | 5 900 | 302 | 95 | 9.23 |
| 2-methylnaphthalene | 175 | 4.2 | 98 | 3.96 |
| 1-methylnaphthalene | 1.4 | _1) | _2) | 0.29 |

We claim:
1. A process for the separating of both water-insoluble aromatic hydrocarbons and water-soluble aromatic hydrocarbons from a waste water containing same, which comprises the steps of:
   (a) filtering the waster water through a slotted multiple tube filter on whose surface is coated an adsorbent layer of coking duff, said coking duff having a grain size distribution in the particle size range of between 0.05 and 0.2 mm and having a mass proportion of at least 25% by weight with a surface of at least 1500 cm$^2$/g, whereby the water-insoluble hydrocarbons and the water-soluble hydrocarbons are taken up by the adsorbent layer of coking duff in a single step to provide clean water as a filtrate; and
   (b) discharging the clean water.

2. Process according to claim 1, wherein the grain size distribution of the coking duff for the particle size range of 0.05 to 0.2 mm has a mass proportion of at least 40% by weight.

3. Process according to claim 1, wherein the coking duff is predeposited onto the filter surface.

4. Process according to claim 1, wherein the coking duff is added to the waste water partially or entirely, prior to filtration.

5. Process according to claim 1, wherein the amount of coking duff equals 0.1 to 1% by weight of the waste water amount.

6. Process according to claim 1, wherein following step (a) the coking duff is disposed of through burning or pyrolysis.

7. Process according to claim 1, wherein following step (a) a subsequent adsorption stage is provided as a further treatment stage.

8. A process for the separating of both water-insoluble hydrocarbons and water-soluble aromatic hydrocarbons from a waste water containing same, which comprises the steps of:

(a) filtering the waste water through a slotted multiple tube filter on whose surface is coated an adsorbent layer of coking duff, said coking duff having a grain size distribution in the particle size range of between 0.05 and 0.2 mm and having a mass proportion of at least 25% by weight with a surface of at least 1500 cm$^2$/g, whereby the water-insoluble hydrocarbons and the water-soluble hydrocarbons are taken up by the adsorbent layer of coking duff in a single step to provide clean water as a filtrate;

(b) treating the clean water obtained in step (a) by reverse osmosis to further purify the clean water; and (c) discharging the clean water.

* * * * *